No. 624,594. Patented May 9, 1899.
M. L. WILKINSON.
MOTIVE POWER MECHANISM.
(Application filed June 8, 1897.)
(No Model.) 5 Sheets—Sheet 1.

Fig.1.

WITNESSES:
INVENTOR
Melville Lincoln Wilkinson
BY
ATTORNEY.

No. 624,594. Patented May 9, 1899.
M. L. WILKINSON.
MOTIVE POWER MECHANISM.
(Application filed June 8, 1897.)
(No Model.) 5 Sheets—Sheet 2.

WITNESSES: INVENTOR
Melville Lincoln Wilkinson
BY
ATTORNEY.

No. 624,594. Patented May 9, 1899.
M. L. WILKINSON.
MOTIVE POWER MECHANISM.
(Application filed June 8, 1897.)
(No Model.) 5 Sheets—Sheet 4.

WITNESSES:
N. S. Rollins
Edward W. Foogy

INVENTOR
Melville Lincoln Wilkinson
BY John Day
ATTORNEY.

THE NORRIS PETERS CO., PHOTO-LITHO., WASHINGTON, D. C.

No. 624,594. Patented May 9, 1899.
M. L. WILKINSON.
MOTIVE POWER MECHANISM.
(Application filed June 8, 1897.)
(No Model.) 5 Sheets—Sheet 5.

WITNESSES:
H. S. Rollins
Edward W Forgy

INVENTOR
Melville Lincoln Wilkinson
BY
S. John Day
ATTORNEY.

UNITED STATES PATENT OFFICE.

MELVILLE LINCOLN WILKINSON, OF LOS ANGELES, CALIFORNIA.

MOTIVE-POWER MECHANISM.

SPECIFICATION forming part of Letters Patent No. 624,594, dated May 9, 1899.

Application filed June 8, 1897. Serial No. 639,914. (No model.)

*To all whom it may concern:*

Be it known that I, MELVILLE LINCOLN WILKINSON, of the city of Los Angeles, in the county of Los Angeles and State of California, have invented certain new and useful Improvements in Motive-Power Mechanism, of which the following is a full, clear, and exact description or specification, reference being had to the accompanying sheets of drawings and to the letters marked thereon.

My invention, which relates to certain new and useful improvements in motive-power mechanism, has for its object, in the first place, to enable the sudden development of energy by explosion within the cylinder of an explosion-engine of a mixture of gasolene-vapor and air or other explosive mixture, such as that of acetylene and air, to be so used that the very rapid rise and quickly-succeeding fall of pressure which occurs on one side of the piston only in the cylinder of an explosion-engine shall be employed for compressing air into a reservoir, which compressed air is then utilized to actuate a piston or pistons in the cylinder or cylinders of a compressed-air engine by operating upon each side of the said piston or pistons of a compressed-air engine alternately, thus converting the sudden, discontinuous, or jerky driving action of an engine which operates by explosion into a steady driving action which continues throughout the entirety of all the strokes of a compressed-air engine.

My invention has for its object, in the second place, to prevent the reduction of pressure of the compressed air used in the compressed-air engine or engines from at any time being lowered to such a point as would correspond with a lowering of temperature below the freezing-point of water or oil used as a lubricant. This object I effect by preventing the air after it escapes from the compressed-air engines from exhausting into the atmosphere and causing it to expand into a reservoir, in which the pressure of air is always maintained at a point which insures a temperature within that reservoir above the freezing temperature. From this reservoir the exhausted air is pumped into another reservoir maintained at the higher pressure utilized in the compressed-air engines.

My invention has for its object, in the third place, to enable compressed-air engines to be started or stopped at all times without the necessity of starting or stopping the explosion-engine. This object I effect by automatically regulating the speed of the explosion-engine and by stopping the action of the air-pump when the compressed-air engine or engines are stopped by the pressure of air in the reservoir of higher pressure.

One important result following from the combination of motive-power mechanism which I use in carrying out my invention is that the dead-centers of the compressed-air engines are overcome, thus enabling them to be started from all positions of the cranks.

In motive-power mechanism constructed according to my improvements and embodying the objects described in the preceding paragraphs I use an explosion-engine—that is to say, an engine the piston in the cylinder of which is operated by ignition and consequent explosion of an explosive mixture, such as the mixture of gasolene-vapor with air or acetylene with air or by the explosion of the analogue of such explosive mixtures, such as coal-gas or the gas or vapor resulting from any of the hydrocarbonaceous products or distillates of coal or mineral oil. Under my present improvements the explosion-engine operates an air-pump which directly compresses air into a reservoir. The compressed air from this reservoir is led into the admission-ports of the cylinder or cylinders of compressed-air engines and in such manner that the compressed air is distributed and exhausted alternately to and from opposite sides of the piston or pistons operating in the cylinder or cylinders of the compressed-air engines.

In carrying my invention into practice I prefer to employ compressed-air engines having two cylinders, so that the air escaping from the first cylinder—that is to say, the cylinder operating with the maximum of air-pressure employed, shall discharge the compressed air at the termination of each stroke by as short a passage as possible to a second cylinder of larger capacity, and therefore operating at a lower pressure.

The pipe whereby the compressed air, after having done its work within the cylinder or cylinders and escaped therefrom, is led to a reservoir, wherein the pressure is always maintained at a point which insures that the temperature therein shall always be above the freezing-point of water, and the air exhausted from that reservoir is pumped into the first-mentioned reservoir at higher pressure in place of escaping into the atmosphere. In this manner not only is any residual capacity in the escaping compressed air for performing work prevented from being lost, but such heat as is or may be contained in the exhausted compressed air is also prevented from escaping or being wasted.

The air-pump which, as hereinbefore stated, is driven by the explosion-engine is connected on its admission side by means of pipes and valve-chests with a reservoir whereinto the compressed air passes from the cylinder or cylinders of the air-engine after having done its work therein, and it is this air which is successively drawn into and through the said air-pump and compressed again into the reservoir of more highly compressed air which drives the air-engine. None of the air excepting that which may be due to leakage is under this arrangement allowed to escape into the atmosphere, but the same air is used in repeated succession within and through the air-motor parts of the mechanism constituting my invention. A valvular arrangement communicating with the outside atmosphere is used for supplying air to the apparatus and for making up any loss thereof due to leakage.

It is here explained that the pressure at which the air exhausts from the cylinder or cylinders of the compressed-air engine is such that the lowering of its temperature, due to expansion, is never sufficient to produce a degree of cold that could freeze any aqueous or oleaginous vapor which it may contain, so that obstruction to the working of the compressed-air engine by the artificial formation of ice or snow, due to the occurrence of a very low temperature, is prevented.

Figure 1:
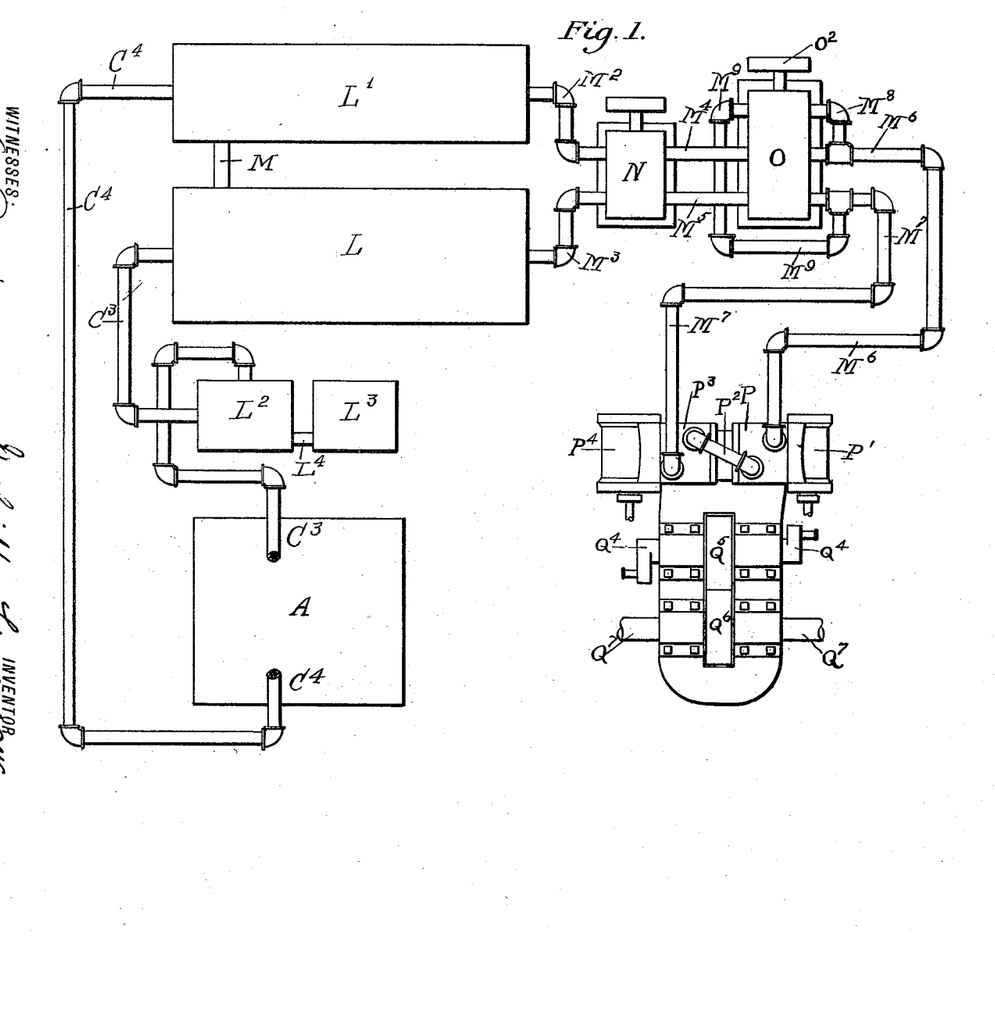
Fig. 1 is a diagram exhibiting in plan the arrangement and relationship of my improved motive-power mechanism consisting of the explosion-engine, the air-reservoirs, the regulators, their several connections, and the compressed-air engines.

In the annexed drawings, with the exception of the diagrammatic plan, Figure 1, the several parts of the mechanism are of necessity shown more or less detached from each other, this being essential in order to illustrate the special features of the construction and operation of the several parts of the mechanism which could not be explicitly shown upon the smaller scale necessarily adopted for the general plan view, the object of which is to more especially show the relative positions and connections of the several parts of the mechanism constituting my invention.

On the accompanying drawings, Fig. 4 is a plan of the explosion-engine corresponding to Figs. 2 and 3. Fig. 5 is a vertical section, enlarged, of the device for feeding and mixing gasolene or other explosive agent with air in order to produce the explosive mixture exploded in the cylinder of the explosion-engine. Fig. 5$^a$ is a plan of part of Fig. 5. Fig. 6 is a vertical section, enlarged, of the device which regulates the feed or supply of the explosive mixture to the cylinder of the explosion-engine. Fig. 7 is a vertical section of the exhaust-valve of the explosion-engine. Fig. 8 represents, partly in elevation and partly in dotted lines, the arrangement of the variable toothed gear for operating the exhaust-valve of the explosion-engine. Fig. 9 is an inverted plan of the piston of the explosion-engine with the piston-rod and connection-rod or pitman shown in transverse section. Fig. 10 is a vertical section corresponding to Fig. 9. Fig. 11 is a side elevation of the sparking device for igniting the explosive mixture in the explosion-engine. Fig. 12 is a plan corresponding in part to Fig. 11. Fig. 13 is a side elevation of the device for regulating the time of feeding the explosive mixture to the cylinder of the explosion-engine. Fig. 14 is a vertical section of the lower valve for admitting air to the air-pump. Fig. 15 is a view, partly in section, partly in plan, and broken through, showing the reservoir of highly-compressed air. Fig. 16 is a corresponding view of the reservoir, into which the compressed air on escaping from the cylinders of the air engine or engines exhausts. Fig. 17 is a longitudinal section of the air-chest for admitting air to the air-pump operated by the explosion-engine. Fig. 18 is a longitudinal section of the strainer for straining the air drawn from the outside atmosphere by the air-pump. Fig. 19 is a plan of the reversing device. Fig. 19$^a$ is an end elevation of same. Fig. 20 is a plan of the controlling device. Fig. 21 is an end elevation corresponding in part to Fig. 20. Fig. 22 is a transverse section of the reversing device, showing the parts in position when the air passes straight through it—that is to say, for forward driving. Fig. 24 is a transverse section of the reversing device, showing the plug in the position at right angles to that shown at Fig. 22—that is to say, for backward driving—the connecting-passages being shown by dotted lines. Fig. 25 is a horizontal section on the line $a\,a$, Fig. 24. Fig. 26 is a transverse section of the controlling device when open for operation. Fig. 27 is a horizontal section of this device on the line $b\,b$, Fig. 26. Fig. 28 is a transverse section of the controlling device, showing the plug in the position when the air is cut off and in the case of a railway-car operated by means of my improved motive-power engine used when the car is running on level—that is to say, by the action of its own inertia—or down a gradient by the action of gravity without the compressed air being used for propelling it. Fig. 29 is a transverse section of the controlling device on the line *b b*, Fig. 28. Fig. 30 is another transverse section of the controlling device in the position when the engine is running by inertia, such as is commonly called "coasting" in the case of street-railway motor-cars. The full lines in this figure indicate the passages open for running by inertia, while the dotted lines indicate the motive-valve openings. Fig. 31 shows the position of this controlling device turned through a small angle to the left when it closes the inertia-operating ports. Fig. 32 is a horizontal section of the controlling device, with the ports in the position opening to the motors from the high and low pressure reservoirs, respectively, to operate the compressed-air engine.

Figures 2, 3:
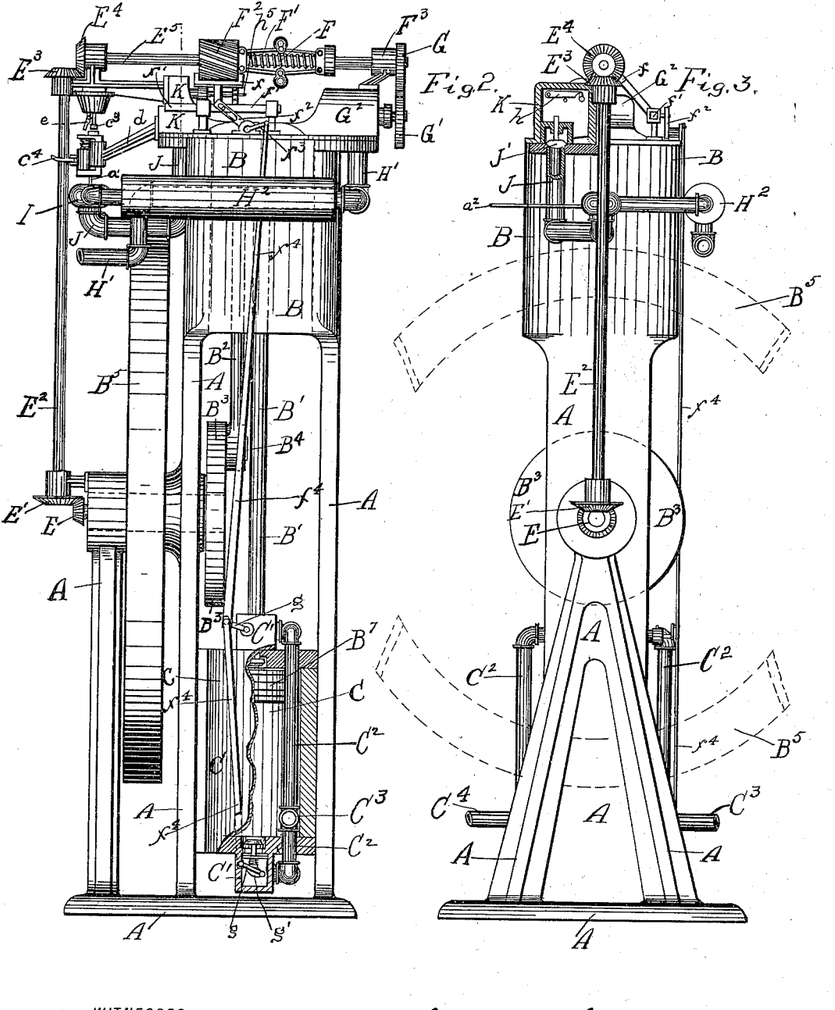
Fig. 2 is a side elevation of an explosion-engine and air-pump such as I use for compressing the air into the reservoir from which the compressed air is led to operate the compressed-air engine or engines.
Fig. 3 is an end elevation corresponding to Fig. 2.

In Figs. 1, 2, 3, and 4 the main framing of the explosion-engine is marked A, the cylinder is marked B, and the compressing air-pump is marked C. Within the cylinder B there operates the piston D. (Shown in detail at Figs. 9 and 10.) As will be seen from these figures, the piston-rod B' is connected to the piston by means of a projecting portion $B^6$ at the interior thereof and situated sufficiently at one side of the hollow portion to leave room for the pin D', to which the connecting-rod or pitman $B^2$ is coupled, as shown. The piston-rod B' is at its lower end connected to the plunger $B^7$, contained within the air-pump cylinder C. The connecting-rod $B^2$ is connected to the crank-pin and crank $B^4$, Fig. 2. The crank-disk $B^3$ is carried upon the driving-shaft, of which the one end portion only is seen in Figs. 2 and 3. This end portion of the driving-shaft carries the bevel-pinion E, which gears into the bevel-wheel E' and so actuates the vertical shaft $E^2$. The crank-shaft carries the fly-wheel $B^5$ for regulating and storing the energy of the explosion of the gaseous mixture acting upon the piston D in the explosion-cylinder B. Valve-boxes C' are situated, respectively, at the upper and lower ends of the air-pump cylinder C, and these valves are so arranged, as hereinafter described, when the engine is running light—that is to say, without load—that the valves in the upper and lower valve-boxes C', the lower of which valves and valve-boxes is shown on an enlarged scale in Fig. 14, are held open by the action of the governor to prevent the piston from pumping air into the high-pressure reservoir, as hereinafter described. The pipes $C^2$ respectively connect the upper and lower valve-boxes C', and their branches $C^3$ and $C^4$ lead to the reservoir in which the compressed air utilized for driving the air-engine hereinafter described is contained. The valves in the upper and lower valve-boxes C', of which there are four—two at the upper end and two at the lower end of the pumping-cylinder C, respectively—when the engine is pumping air are operated by the action of the piston alternately to draw and compress air on each side of the piston alternately at every stroke. At the top of the vertical shaft $E^2$ there is carried a bevel-pinion $E^3$, which gears into another pinion $E^4$ upon the horizontal shaft $E^5$. This horizontal shaft $E^5$ has mounted upon it a centrifugal governor F, which accordingly as its balls spread out from the axis of the shaft $E^5$, thereby compressing the spring F', move the broad revolving pinion $F^2$ horizontally upon the shaft $E^5$. At the other end the shaft $E^5$ is carried in the bearing $F^3$ and has mounted at its outer end the variable toothed wheel G, gearing into another variable toothed wheel G' upon the shaft of the exhaust-valve contained within the casing $G^2$. At Fig. 7 the exhaust-valve is shown in section enlarged, the part marked G' being a portion of the cam carried upon the spindle of the valve $G^3$. The exhaust products of the explosion within the cylinder B pass from the upper end of that cylinder through the passage H, through the valve $G^3$, thence through the exhaust-pipe H', partly contained within the casing $H^2$, Figs. 2 and 3. The variable toothed wheels G and G' are so arranged as to rotate the exhaust-valve $G^3$ to have it in the open position at the period of exhaust and in the closed position at all other times. The exhaust products of the explosion passing through the exhaust-valve and exhaust-pipe H' give out their heat to the surrounding casing $H^2$, and the air which is led into the feeding and mixing device I, (shown enlarged and in detail at Figs. 5 and $5^a$,) passes thereinto by the casing $H^2$, which is provided at that end nearest the exhaust-valve with a perforated sieve or wire-gauze, (not shown in the drawings,) for the purpose of sifting any solid or impure matter from the air. This air in passing through the casing $H^2$ becomes heated and passes into the mixer, which contains a conical device. (Shown within Fig. 5.) This conical device has within it the needle-valve *a*, forming the lower part of the stem *a'*, and the gasolene or other hydrocarbon is led thereinto by the pipe $a^2$. The lower part $a^3$ of the conical device is formed of a convex perforated plate, and the upper part thereof consists of a cylindrical ring $a^4$, carried by a spindle $a^5$. Within this conical device a horizontal disk $b$ is carried by uprights $b'$, whose lower ends are attached to the interior of the conical part of the device. Thus when the rod $a'$ lifts the ring $a^4$ it allows the heated air contained within the casing inclosing these parts to pass to the interior of the conical device, and as this takes place at the same time that the needle-valve $a$ opens to permit the gasolene or other hydrocarbon to drop upon the perforated plate $a^3$ the complete mixture of the heated air and hydrocarbon is effected and in the necessary proportions to constitute the explosive mixture in the act of their passage together through the perforations in the plate $a^3$, thence into the passage J, whereby they are conducted to the upper part of the explosive-cylinder B of the engine, as shown in section at Fig. 3.

Figures 4, 5, 5A, 6, 7, 8, 9, 10, 11, 12, 13, 14:
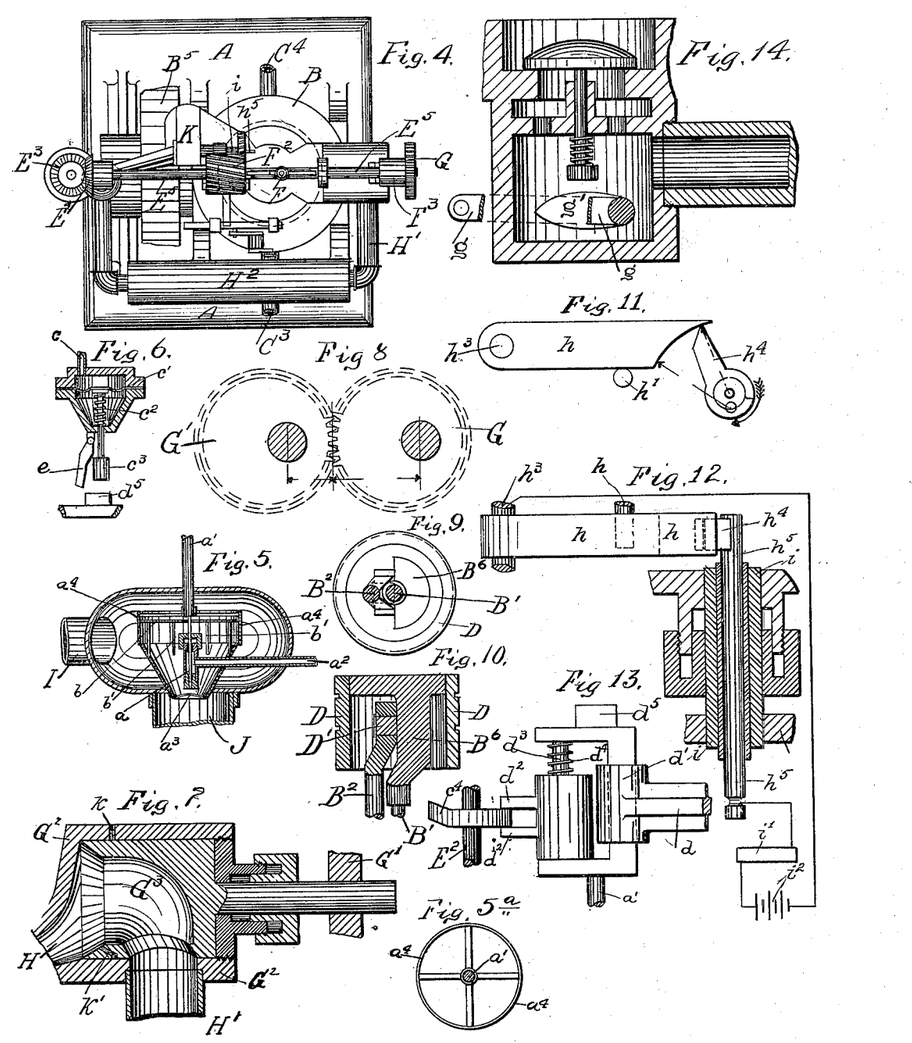

Within the casing K, Figs. 2, 3, and 4, the valve for admitting the gaseous or explosive mixture to the engine is contained. This is an inverted spindle or mushroom-valve $J'$.

For the purpose of regulating the quantity of the explosive mixture which is admitted to the cylinder B the regulating device shown in enlarged section is connected by the pipe $c$ to the high-pressure compressed-air reservoir, the pressure in which operates constantly on the flexible diaphragm $c'$ within the casing of the device shown in Fig. 6, compresses the spiral spring $c^2$, also there shown, and at the same time forces downward the stop $c^3$. The cam $c^4$, carried upon the shaft $E^2$ and shown enlarged in Fig. 13, moves the stem $a'$ of the feeding and mixing device upward and downward, and the position of the stop $c^3$ regulates the extent to which the stem $a'$ and its connected parts, consisting of the gasolene-valve $a$ and the air-admitting ring $a^4$, are moved, whereby the quantity of air and gasolene admitted into the cylinder of the explosive-engine are from time to time and continuously regulated. The device, Fig. 13, is carried in the arm $d$, projecting from the upper part of the casing K of the admission-valve to the cylinder B, and it is so constructed that while being capable of being slid upward and downward in the guide $d'$, carried by the arm $d$, yet the extent of that upward movement is regulated by the depression or raising of the stop $c^3$. This is effected in the following manner: That part of the sliding device in which the cam $c^4$ operates and engages with—namely, the projecting studs $d^2$—is carried upon a vertical pin $d^3$, the free space at the top of which is surrounded by the spiral spring $d^4$. Should the stop $c^3$ be so much depressed that when the upper portion $d^5$ of the sliding device comes into contact with it so as to prevent the sliding device from rising to the full height due to the upward throw of the cam $c^4$, then the spring $d^3$ is compressed without producing any further opening of both the air-valve and hydrocarbon-valve than that corresponding to the quantity of gaseous mixture required to be exploded in the cylinder B of the explosion-engine, and when a minimum quantity of such explosive mixture is required in the cylinder of the explosion-engine then the suspension-piece $e$ falls by the action of gravity into the vertical position, the stop $c^3$ being sufficiently depressed to admit of that, and this coming into contact with the sliding piece $d^5$ during its upward movement insures that the minimum feed of explosive mixture is admitted to the cylinder of the explosion-engine.

As the rotating inclined toothed roller or pinion $F^2$ is moved on the shaft $E^5$ by the action of the governor the sliding frame $f$, with which the roller or pinion $F^2$ is engaged, moves the sliding bar $f'$ backward and forward, and this having a pin, as shown in Fig. 2, engaging with the lever $f^2$, operates the lever $f^3$, which again actuates the connecting-rods $f^4$, that are connected to the levers $g$, operating the cams $g'$, one of which is shown enlarged in Fig. 14, for holding open the valves of the air-pump.

The apparatus I use for igniting the gaseous mixture within the cylinder of the explosion-engine is shown in section, Fig. 3, and in detail, Figs. 11 and 12. This igniting device consists of a pivoted finger $h$, held in a horizontal position by a stop $h'$ at the under side of the finger $h$. The end of the finger opposite to the pivot $h^3$ is concave, the radius of the arc of which concavity is a little greater than the length of the projection $h^4$ on the rotating rod $h^5$, which carries it, so that the contact between $h^2$ and $h$ is so gradual that the finger $h$ will not jump away on being hit by the projection $h^4$. This projection $h^4$ is on a rod carried through and insulated from the shaft $i$, which causes it to revolve. One side of an electric circuit consisting of an induction-coil $i'$ and a battery $i^2$ is fastened to this rod $h$. The other side of this circuit is connected to any other part of the mechanism which carries the electricity to the finger $h$. When the projection $h^4$ on the end of the rod $h^2$ revolves, it makes an electrical connection from the battery $i^2$, through the induction-coil $i'$, through the projection $h^4$ on the rod $h^5$, and back through the finger $h$ to the battery $i^2$. When the shaft has revolved, carrying the projection $b^4$ out of contact with the end of the finger $h$, the induction-coil causes an electric arc to be produced between the projection $h^4$ and the finger $h$, the arc causing the explosive mixture to ignite and explode within the cylinder B.

With regard to the exhaust-valve shown at Fig. 7 the casing $G^2$ of the said valve $G^3$ is constructed with an opening $k$, which is connected with an oil-cup. (Not shown in the drawings.) During the rotation of the valve $G^3$ within the casing $G^2$ the opening $k'$ in the valve comes opposite the opening $k$ in the casing, so that a direct passage is formed during the time these openings $k$ and $k'$ are opposite each other, and there then exists unimpeded communication between the oil-cup and the interior of the cylinder B of the explosion-engine. This communication between the oil-cup and the interior of the cylinder B is arranged to occur during the time that a partial vacuum exists within the cylinder B, so that the atmospheric pressure acting in the oil-cup forces some of the oil into the cylinder B, and thereby the piston operating therein is lubricated.

It is here explained that the cylinder B of the explosion-engine is constructed with a water-jacket, as is usual in connection with explosion-engines generally, the water flowing through which carries off some of the heat generated by the explosion and keeps the cylinder at the requisite temperature.

Referring to Fig. 1 of the annexed drawings, the upper pipe shown thereon (marked $C^3$) is that by which the air-pump C, Figs. 2 and 3, is on the air-admission or suction side thereof connected to the low-pressure air-reservoir L. The lower pipe (marked $C^4$ in the said Fig. 1) is that by which the air-pump C, Figs. 2 and 3, is on its pressure or discharge side connected to the high-pressure reservoir L'. The two pipes marked $C^3$ and $C^4$, Fig. 1 correspond to the two pipes marked $C^3$ and $C^4$ in Figs. 3 and 4, also at Figs. 15 and 17. It is here explained that the air-pump C is not directly connected to the low-pressure reservoir L, but is in communication therewith through the air-admission chest $L^2$, also shown in longitudinal section at Fig. 17. This chest $L^2$ is provided with the strainer $L^3$. (Shown in section at Fig. 18.) The air-chest $L^2$ and the strainer $L^3$ are connected together by the passage $L^4$.

The object in providing the air-admission chest $L^2$ and its connected strainer $L^3$ is for the purpose of maintaining at all times a constant supply of compressed air in the reservoirs operated by compressed air circulating through the apparatus, this being essential for the reason that small losses of air take place in the apparatus through leakage at the glands or stuffing-boxes and possibly in other parts thereof. Therefore by means of this arrangement when the air-pump C is being operated by the explosion-engine and while it is drawing its main supply of air from the reservoir L—the reservoir L being the receptacle whereinto each discharge of air from the cylinder or cylinders of the air-engine is received—any loss of air which takes place by leakage is made up by a corresponding supply of air drawn in through the strainer $L^3$, the connection $L^4$, the valve $L^5$, and thence through the pipe $C^3$ to the admission-valve boxes of the air-pump C.

Figures 15, 16, 17, 18, 19, 19A, 20, 21:
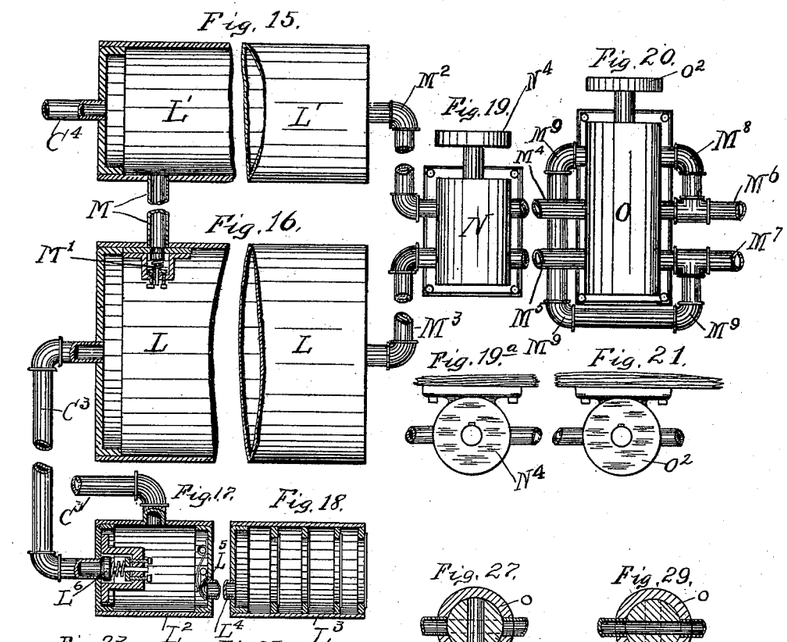
Figure 23:
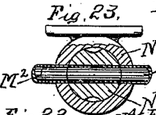
Fig. 23 is a horizontal section of Fig. 22 upon the line $a\,a$, Fig. 22.
Figure 33:
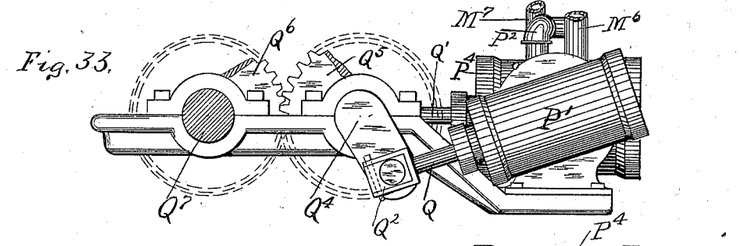
Fig. 33 is a side elevation of the compressed-air engine especially adapted for operating motor-cars.
Figure 34:
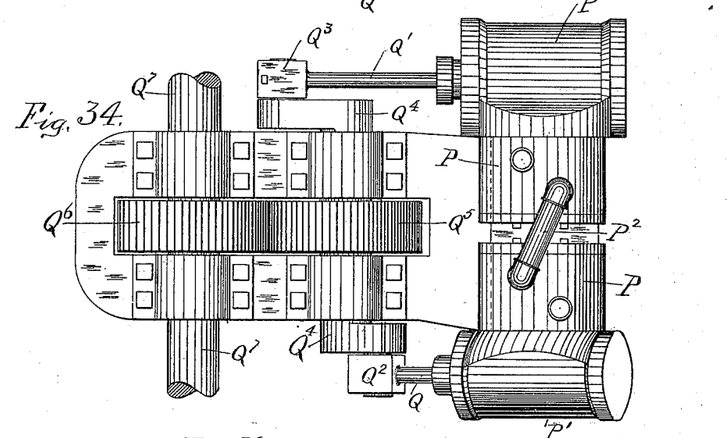
Fig. 34 is a plan of such engine.
Figures 35, 36, 37, 38:
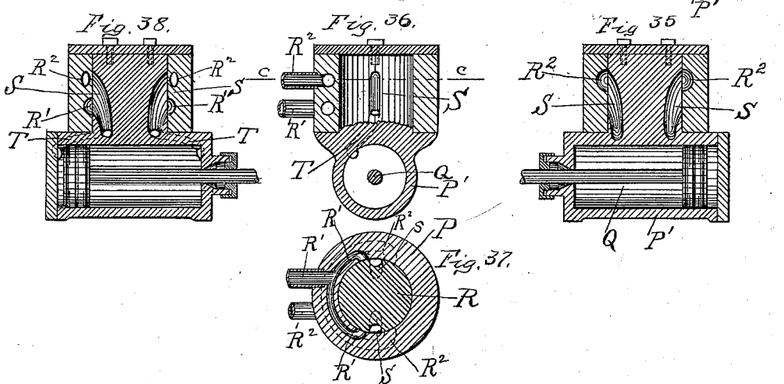
Fig. 35 is a longitudinal section of the high-pressure cylinder of the compressed-air engine, showing the arrangement of ports for admitting and releasing the compressed air to and from the cylinder.
Fig. 36 is a transverse section of the high-pressure cylinder in a plane perpendicular to the piston-rod.
Fig. 37 is a transverse section on the line *c c*, Fig. 36.
Fig. 38 is a longitudinal section of the high-pressure cylinder inverted, showing the arrangement of the ports looking upward.

For the purpose of maintaining the pressure of the reservoir L so that it shall not exceed a certain amount the admission-chest $L^2$, which, as aforesaid, is connected to the reservoir L by the pipe $C^3$, is provided, as shown at Fig. 17, with the pop-valve $L^6$, compressed to its seat by the spring, as shown in the said figure. The object of this arrangement is further to prevent any air being drawn by the pump from the reservoir L until the pressure therein is sufficient to press open the pop-valve $L^6$, and at all times when the pressure is less than that corresponding with the weight or pressure with which the pop-valve $L^6$ is loaded the air-pump C draws its supply of air from the outside atmosphere alone through the strainer $L^3$, the branch $L^4$, and the valve $L^5$.

The reservoirs L and L' in addition to being connected together by means of the pipes $C^3$ and $C^4$, as hereinbefore described, are also connected together by means of the passage M, Fig. 1, and shown more particularly and in enlarged section at Figs. 15 and 16. That portion of the passage M which is situated within or in direct connection with the low-pressure reservoir L is also provided with another pop-valve M', loaded by the spiral spring, as there shown. The object of this pop-valve M' is to prevent pressure of air accumulating in the reservoir L' in excess of the limit fixed for the air to enter the high-pressure cylinder of the compressed-air engine. The pop-valve M' therefore allows the escape of such air as may at times accumulate in the reservoir L' into the low-pressure reservoir L, which prevents any undue accumulation of air-pressure in the reservoir L', and therefore in the cylinders of the air-engine, taking place.

At Fig. 1 and also on enlarged scale at Figs. 19 and $19^a$ is shown the device which I employ for reversing the direction of rotation of the crank-shaft operated by the air-engine, this being necessary in all cases where the driving-shaft of the engine is required to operate in opposite directions and not necessary where the driving-shaft of the engine always operates in the same direction, as in the case of many applications of stationary engines. This reversing device consists of the cylindrical casing N, Figs. 1, 19, 22, 23, 24, and 25. This cylinder N is fitted with a rotating cylindrical or tapered plug N', Figs. 22, 23, 24, and 25. This plug N' is constructed with passages arranged as follows: The air from the high-pressure cylinder passes out therefrom by the pipe $M^2$, through the casing N, into the ports in the plug N', as now to be explained and described. The plug N' has in it four ports $N^2$ and $N^3$. The ports $N^2$ pass straight through the plug, and the air passing out from the high-pressure reservoir L' passes through one of the ports $N^2$ on its way to the cylinder or cylinders of the compressed-air engine, and the air exhausting from the compressed-air engine after the termination of the stroke of the piston therein passes in the reversed direction through the other ports $N^2$ on its way to the low-pressure reservoir L. When it is desired that the direction of motion of the driving-shaft of the engine should be reversed—that is to say, that it should rotate in a direction opposite to that which corresponds with the utilizing of the straight passages $N^2$ in the plug $N'$ in the position shown at Fig. 22—then the plug $N'$ is turned on its axis through an angle, so as to bring the inclined ports $N^3$ therein (shown in dotted lines in Fig. 24 and in transverse section at Fig. 22) opposite to or in connection with the pipes $M^2$ and $M^3$, in which position the air passes into and escapes from the ends of the cylinders opposite in position to that which corresponds with the position of the plug $N'$. (Shown at Fig. 24.) The air on being led through the reversing device herein last described is thence led through a controlling device before passing into the cylinder or cylinders of the compressed-air engine, and the air as it is discharged at the exhaust-pressure from the compressed-air engine passes out through the said controlling device before entering the reversing device on its way back to the low-pressure air-reservoir L. This controlling device is necessary for the purpose of regulating the supply of air from the high-pressure reservoir at the starting and stopping of the compressed-air engines and also for regulating them when in motion. This controlling device, as shown at Figs. 1, 20, 21, 26, 27, 28, 29, 30, 31, and 32, consists of the cylindrical casing O, wherein is a cylindrical or tapered plug $O'$, capable of being rotated therein by means of the hand-wheel $O^2$, Figs. 1, 20, and 21. The cylindrical casing N is connected to the cylindrical casing O by means of pipes $M^4$ and $M^5$. The compressed air on escaping from the reversing device and passing straight through the ports therein, as shown in the position at Fig. 22, enters the controlling device and passes through the port $O^3$, Fig. 26, into the pipe $M^6$, whence it escapes into the casing P of the high-pressure cylinder $P'$ of the motive-power engine. The air so led thereto after having done its work during each acting stroke of the piston in the cylinder $P'$ returns by the ports hereinafter described, whence it escapes by the pipe $P^2$ into the casing $P^3$, from which it is led by the ports hereinafter described to operate the piston in the low-pressure cylinder $P^4$. The air after having done its work in the low-pressure cylinder $P^4$ is returned by the ports, as hereinafter described, whence it escapes by the exhaust-pipe $M'$ through the controlling device and pipe $M^5$ and reversing device and pipe $M^3$ into the low-pressure reservoir L.

For the purpose of preventing a compressed-air engine constructed and operated in accordance with my present invention from compressing the residual air within its cylinder or cylinders at such times as when the supply of air from the high-pressure reservoir $L'$ is or may be cut off by the controlling device herein last described this controlling device is further constructed to provide against such accumulation of pressure in the residual air taking place, as follows: The pipe $M^6$, hereinbefore referred to, is connected by the pipe $M^8$ to the upper port $O^5$ of the controlling device, and which port $O^5$ becomes connected to the pipe $M^8$ when the controlling device is turned into the position to shut off the supply and exhaust ports $O^3$ and $O^4$ from their connections for admitting air to the air-engine, and the residual air escaping from the low-pressure cylinder $P^4$ through the pipe $M^7$ passes by the passage $M^9$ through the port $O^5$ of the controlling device, Figs. 26, 27, 28, and 29, thence through the pipe $M^8$ into the pipe $M^6$, and thence into the high-pressure cylinder of the engine.

For the purpose of admitting and exhausting the compressed air alternately from opposite sides of the cylinders of the motive-power engines the cylinders and valve-casing are provided with ports, as now to be described, it being here explained that an engine such as I find it convenient to use in carrying out my invention is constructed after the manner more especially shown in Fig. 1 and in enlarged views Figs. 33 to 38 of the annexed drawings. The engine shown by these figures is an engine having oscillating cylinders for the purpose of causing it to occupy a minimum of space, such as is necessary in using my invention for driving the axles of a motor-car on street or other railways. In Figs. 1 and 33 to 38 the piston-rod Q of the high-pressure cylinder $P'$ and the piston-rod $Q'$ of the low-pressure cylinder $P^4$ are connected to the cranks upon the crank-shaft $Q^4$ by the wrist-pin boxes $Q^2$ and $Q^3$. As shown upon the drawings, the crank-shaft $Q^4$ has mounted on it a pinion $Q^5$, which gears into another pinion $Q^6$ upon the driving-shaft $Q^7$, which may be one of the axles of a motor-car or other driving-shaft. In the engine as shown the cylinders $P'$ and $P^4$ are each mounted upon one trunnion R, as shown in section, Figs. 35, 36, 37, and 38. The trunnions R, with their respective cylinders $P'$ and $P^4$, oscillate within the trunnion-casings P correspondingly with the throw of the crank-shaft $Q^4$, and the admission and exhaust ports $R'$ and $R^2$ of the cylinders $P'$ and $P^4$ are so arranged as to admit the air into the high-pressure cylinder at the commencement of and throughout its entire stroke, also to allow the escape of the exhaust-air from each return stroke through the exhaust-passage $P^2$ into the admission-port of the low-pressure cylinder $P^4$, so that it acts upon the piston in the low-pressure cylinder $P^4$ throughout its entire stroke, while the exhaust from the previous stroke takes place throughout the entire return stroke of the piston in the cylinder $P^4$ outward into the low-pressure reservoir L. In Figs. 35 to 38 the ports in the trunnions R, through which admission of the compressed air and exhaust both take place, are marked S, and the passage T leads therefrom to opposite ends of the cylinder. The admission-port is marked $R'$ and the exhaust-port is marked $R^2$ in the casing P.

Having now described the nature of my said invention and the best system, mode, or manner I am at present acquainted with for carrying the same into practical effect, I desire to observe, in conclusion, that while I have designed my improvements in motive-power engines, as shown upon the annexed drawings, as more especially applicable for actuating and driving the axles and wheels of motorcars for street-railways, yet it is to be understood that my invention in its use is not to be limited to this application alone, but that it is adapted as an improved method or means of applying the irregular-developed energy of an explosive-engine into energy acting in continuous quantity or pressure throughout the entire stroke of a motive-power engine driven by compressed air and whose pressure is never allowed to fall low enough to produce a freezing temperature, and that What I consider to be novel and original, and therefore claim as the invention to be secured to me by Letters Patent, is as follows:

1. The automatic device for lubricating the piston in the cylinder of the explosion-engine consisting of the receptacle in the casing of the exhaust-valve to which the supply of air is led, the rotating exhaust-valve having a port in it for communicating with and receiving the oil from said receptacle at the time when the vacuum is formed within the explosion-cylinder, so that the vacuum enables the pressure of the atmosphere to force the oil or other lubricating medium into said cylinder operating substantially as hereinbefore described and shown upon the annexed drawings.

2. The device for regulating the supply of the explosive agent and the air used to form an explosive mixture therewith consisting of the casing having a flexible diaphragm within it, the upper part of said casing being connected by a pipe to the reservoir containing the highly-compressed air which operating upon the flexible diaphragm, depresses said diaphragm and compresses a spring thereby regulating the position of a stop and pendant in such manner that the position of the stop and pendant regulates the height to which the valve and device move for admitting both the explosive agent and the air within the chamber of the mixing apparatus and thereby also regulating the quantity of the explosive agent and the quantity of air used at each stroke of the engine, substantially as hereinbefore described and shown upon the annexed drawings.

3. The explosive agent and air-mixing device consisting of the needle-valve operated by the cam on the vertical shaft driven by bevel-gearing from the fly-wheel shaft of the engine, the ring-formed attachment carried upon the stem of the said needle-valve whose movements correspond with those of the said needle-valve thereby always admitting the explosive agent and air in constant proportion, the disk carried by vertical supports rising from the lower part of this valvular apparatus and carrying the disk at their upper end corresponding in dimensions with the interior of the air-admitting ring and operating in the manner and for the purposes substantially as set forth.

4. The device for operating or lifting the valves for admitting the explosive agent and the air consisting of a vertically-moving block carried upon a vertical stem in the movable framing thereof, and upon which stem the said block is movable by means of the cam situated on the vertical shaft, the said block being also acted upon by means of the spiral spring which yields according to the extent of depression of the stop or the position of the pendant upon the regulating device, all operating together in the manner and for the purposes substantially as set forth.

5. The governor on the horizontal shaft actuating the inclined toothed roller or pinion which actuates a rotating pinion on another horizontal shaft upon that portion of which within the casing is carried the rotating portion of the igniting device for making and breaking contact and thereby producing, in connection with a battery and induction-coil, the spark or sparks for igniting each explosive charge within the cylinder of the explosion-engine, the inclination or angle of the teeth upon the sliding pinion being so arranged that as the said pinion is moved horizontally, the inclination of the teeth causes a variation in the times of the sparking to correspond with the angular position and situation of the crank-shaft substantially as set forth.

6. The electrical igniter consisting of the battery, the induction-coil, the insulated rotating rod, the toothed wheel carried on the tube surrounding the insulated rod, the rotating contact-piece, carried upon that portion of the rotating shaft within the casing, the lifting and lowering contact-finger, the stop, all operating together in the manner and for the purposes substantially as set forth.

In testimony whereof I have hereunto set my hand and seal in the presence of two subscribing witnesses.

MELVILLE LINCOLN WILKINSON. [L. S.]

Witnesses:
ST. JOHN DAY,
H. S. ROLLINS.